United States Patent [19]

Fumarolo et al.

[11] Patent Number: 5,649,132
[45] Date of Patent: Jul. 15, 1997

[54] METHOD AND APPARATUS FOR A RADIO COMMUNICATION SYSTEM CONTROL INTERFACE

[75] Inventors: Arthur L. Fumarolo, Schaumburg; Dana Schwartz, Highland Park; Jennifer E. Chisik, Vernon Hills; Heidi A. Hattendorf, Lake Zurich, all of Ill.

[73] Assignee: Motorola, Inc., Schaumburg, Ill.

[21] Appl. No.: 415,977

[22] Filed: Apr. 3, 1995

[51] Int. Cl.$^6$ .................................................. B06F 3/00

[52] U.S. Cl. ............... 395/342; 364/919.2; 364/927.63; 345/131; 395/345

[58] Field of Search .................. 395/155–161, 395/342, 333, 334; 364/919.2, 927.63; 345/131

[56] References Cited

U.S. PATENT DOCUMENTS

| | | | |
|---|---|---|---|
| 4,961,070 | 10/1990 | Maher et al. | 340/721 |
| 5,060,170 | 10/1991 | Bourgeois et al. | 364/521 |
| 5,191,644 | 3/1993 | Takeda | 395/158 |
| 5,367,624 | 11/1994 | Cooper | 395/157 |
| 5,371,847 | 12/1994 | Hagrove | 395/157 |
| 5,469,540 | 11/1995 | Powers, III et al. | 395/158 |

*Primary Examiner*—Raymond J. Bayerl
*Assistant Examiner*—A. Katbab
*Attorney, Agent, or Firm*—Andrew S. Fuller

[57] ABSTRACT

A radio communication system (100) includes a system control display interface (201) to provide operational control. A radio system control panel (261) is automatically arranged in a relative pattern with respect to other control panels (260) on the display interface (201), such that when operating in a mode that expands beyond predefined borders, the control panel (261) covers a non-critical display area (282) defined on another control panel (262) formed on the display interface (201), but does not cover a critical display area (282) defined on that control panel (262).

13 Claims, 4 Drawing Sheets

METHOD AND APPARATUS FOR A RADIO COMMUNICATION SYSTEM CONTROL INTERFACE

CROSS REFERENCE TO RELATED APPLICATIONS

This application is related to copending U.S. patent application Ser. No. 08/415,911 entitled METHOD AND APPARATUS FOR OPERATIONAL CONTROL OF A RADIO COMMUNICATION SYSTEM, Docket No.: CM02570H—Coley, et al and assigned to Motorola, Inc.

TECHNICAL FIELD

This invention relates in general to operator control interfaces, and more particularly, to operator control interfaces for a radio communication system.

BACKGROUND OF THE INVENTION

Modern radio communication systems can be quite complex. Many systems include numerous channels and other communication resources that must be monitored and controlled by one or more operators. As radio communication systems grow in size and complexity, the ability of a controlling operator, such as a dispatcher, to manage and control a communication system becomes increasingly difficult. In a typical prior art radio communication system, a dispatcher is provided with a console, such as a cathode ray tube (CRT) display console, that allows channel control windows to be accessed, and for system operations control commands to be executed via selections on the console.

With the large quantity of information to be displayed to the operator, the console, which is of fixed dimensions, may not have sufficient display area necessary to present all the options and/or information necessary for the operator. Consequently, the operator may have to scroll pages of information in order to access the desired control information. Additionally, the information and control elements on the display console may not be efficiently presented for a given situation. The organization of console information may differ depending on the situations at hand, by the time of day that the system is operating, by the experience level of the operator among others. Generally, today's console presentations are either fixed, or when configurable, requires substantial effort for reconfiguration.

A need exists for a radio console display that can conveniently accommodate a large number of communication resources, such as channels, options, and control, for the effective management of complex communication system. Such console display should be easily configurable to fit the needs of a particular user or situation. Yet, an operator should not be allowed to reconfigure the system in such a way as to hamper effective control of the radio communication system.

DETAILED DESCRIPTION OF THE PREFERRED EMBODIMENT

Figure 1:
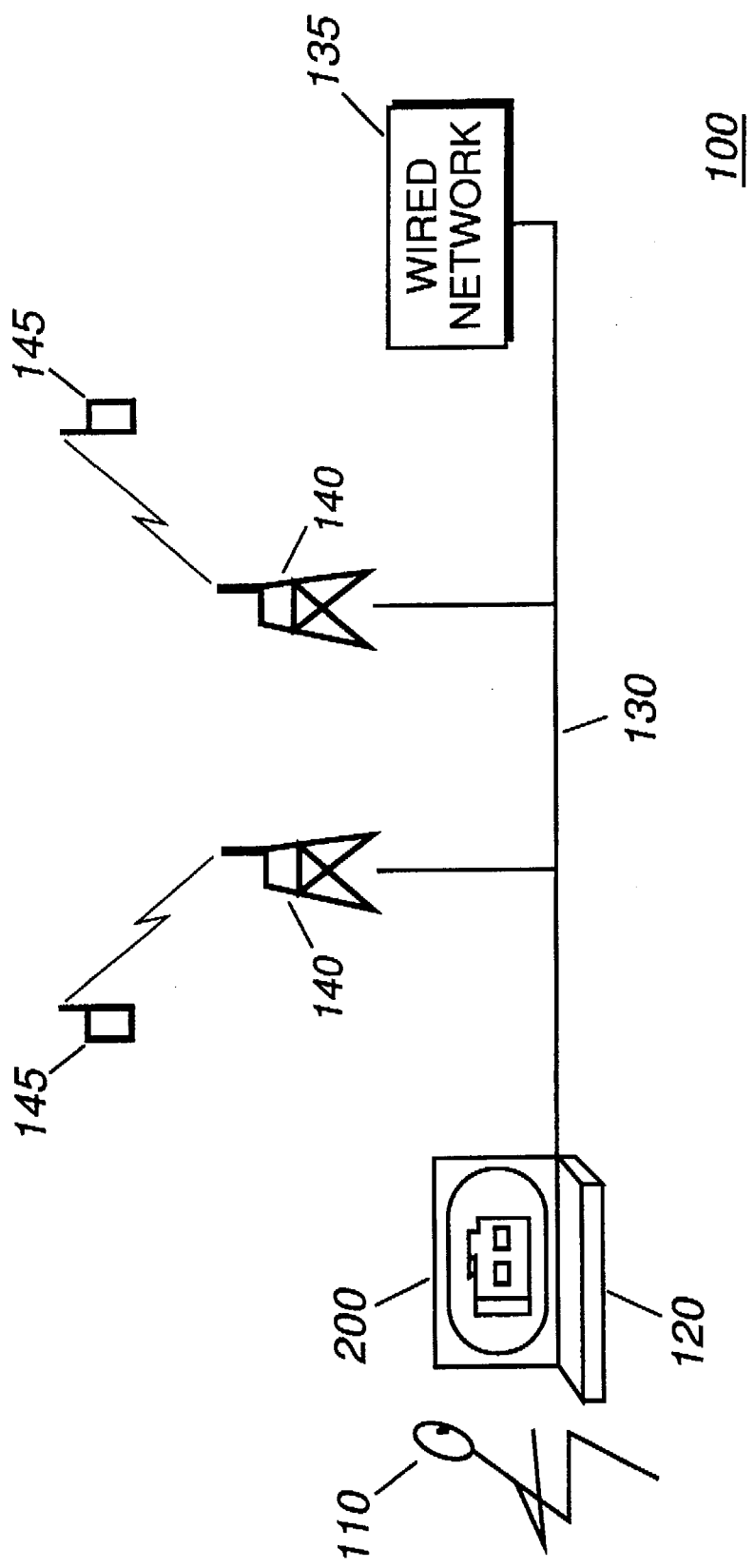
FIG. 1 shows a radio communication system with a operational control interface, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides for a user interface to support operator assisted operational control of a radio communication system. The operational control user interface includes a display unit that has an information display interface through which radio system operations and other functions are performed. The information display interface includes a plurality of radio system control panels, arranged in a pattern thereon, for controlling selected portions of the radio communication system. A particular control panel has at least two operating modes: a compressed mode, in which the control panel is displayed within predefined or original borders; and an expanded mode in which a portion of the particular control panel extends beyond the predefined borders, and potentially covers a portion of a second control panel. According to the present invention, the arrangement of the control panels are automatically restricted to a relative pattern, and the expansion of the particular control panel appropriately limited, such that operation of the particular control panel does not cover a critical display area defined on the second control panel. Operational control of at least a portion of the radio communication system is conducted through one or more radio system control panels that includes the particular control panel.

Referring to FIG. 1, a depiction of a radio communication system 100 is shown in accordance with the present invention. The communication system 100 includes a number of wireless transceivers or communicators 140 which are linked together via a communication network 130. These transceivers 140 interface with remotely situated wireless communication devices 145. The communication network 130 is also coupled to a wired network 135 to provide a telephone line interface and other network interfaces. A computer 120 is coupled to the communication network 130 to provide overall operational control over the radio communication system 100 or a portion thereof. An operator 110 is presented with control information from the control computer 120 through an information display interface 201 implemented via a display unit 200 connected to the computer 120. The operator interfaces with the computer 120 via well-known input devices such as a keyboard, a mouse or other pointing device, and the display unit 200. In the preferred embodiment, the computer 120 is a personal computer (PC) class computing device. However, the present invention is not limited to a specific computing device and may be implemented on any computing device which provides an information display unit which may be accessed by an operator.

Figure 2:
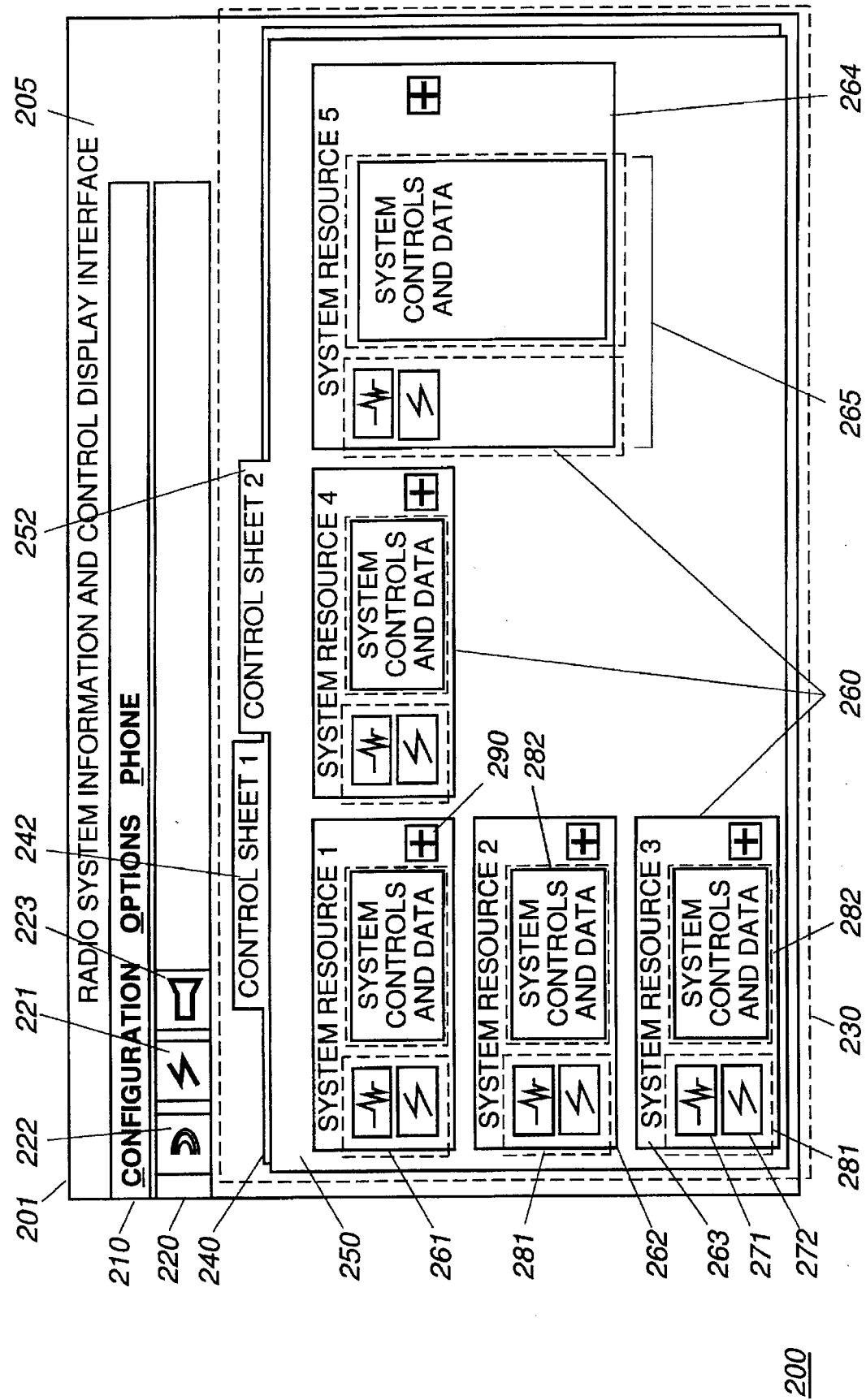
FIG. 2 shows an information display interface having an arrangement of control panels, for controlling a subset of radio communication system operations, in accordance with the present invention.

FIG. 2 shows the display unit 200 incorporating an information display interface 201, in accordance with the present invention. Referring to FIGS. 1 and 2, the information display interface 201 is implemented using a graphical user interface (GUI), or "windowing" operating environment, in which user selections are facilitated by using a pointing device. Such GUI operating systems are quite common in the art. Examples include the Microsoft® Windows Operating System, the Apple Macintosh® Operating System, the UNIX-based X-Windows user interface, among others. Typically, an item on the GUI is "selected" by manipulating a pointing device which controls a cursor, or other indicator on the display unit. A user application program typically allows a user to select an area on the display unit, which may be represented by an icon to invoke an operation by "clicking" or "double-clicking" the area on the display unit indicated by the cursor. Another feature commonly found with GUIs are "pull-down" or "pop-up" menus. A pull-down or pop-up menu is generally activated by engaging a selector switch of the input pointing device when the cursor represented on the display unit is at a particular location, such as by being over an icon or text. The input device and cursor are also used to manipulate graphical objects on the display unit such as by moving, activating, or other manipulations of these graphical objects. Many modern GUIs allow representations such as buttons with iconic depiction, scroll bars, and window manipulation control objects. One skilled in the art would appreciate that these features can be implemented using object libraries and system calls commonly found in application tool kits available for the respective graphical user interfaces and associated operating systems.

In the preferred embodiment, the information display interface 201 is implemented to operate under the Microsoft® Windows Operating System. The control panels, control sheets, and other concepts embodied in the present invention can be implemented in the C++ software language using graphical and other functional library objects available for use with the Microsoft® C++ compiler. For example, certain GUI features are used, such as pull-down or pop-up menus, selectable objects, and features for the manipulation of graphical objects on a display unit, among others. The information display interface 201 executes as a process or task within a multi-task software application that provides operational control of a radio communication system. Other tasks or processes communicate with the information display interface to provide links to communication hardware, and for other functions.

In the preferred embodiment, the information display interface 201 includes a pull-down menu area 210, a toolbar 220, a control sheet display area 230 having control sheets 240, 250 displayed therein, and a logo and system information display area 205. Additionally, the information display interface 201 has provisions (not shown) for accommodating auxiliary functions represented by graphical objects which can be selectively located thereon. The pull-down menu area 210 includes selectable menus for configuration, options, and such other application related functions which are globally applicable, commonly referenced, or otherwise useful to be contained in this area. The content of the toolbar 220 is user definable and may include commonly invoked activities which are preferably available at the touch of a button. Accordingly, the toolbar 220 shown in the preferred embodiment has a transmit button 221, a muting button 222, a speaker enable/disable button 223, among other possibilities.

The control sheets 240, 250 formed on the information display interface 201 are automatically arranged on the display unit 200 to allow at least some of the control sheets 240, 250 to overlap while ensuring that none of the control sheets totally occludes or covers a selectable portion corresponding to another control sheet. Preferably each control sheet 240, 250 is shaped like a folder, and each control sheet has a selectable portion 242, 252 in the form of a tab extending from the control sheet 240, 250. The tabs 242, 252 are arranged on the display area in a stacked arrangement. Thus, even though a large portion of a control sheet may be covered by another control sheet, the tab of the control sheet is automatically positioned so that it is not covered by any other element while the information display interface 201 is active on the display unit 200. Preferably, each control sheet 240, 250 contains an operator configurable category of radio system control information. Generally, the tabs 242, 252 contain identification information, such as text or symbols, that correspond to the category for the control sheet 240, 250. A control sheet 240, 250 is selectively active and may be activated by selecting the tab 242, 252 corresponding to that control sheet. When activated, the control sheet is automatically displayed in a foreground display mode.

The information display interface 201 shown in FIG. 2, depicts an activated control sheet 250 selected from the available control sheets 240, 250 and displayed in the foreground display mode. The activated control sheet 250 has control panels, such as radio system control panels 260, displayed or located thereon, in a grid pattern arrangement. Generally, a control panel is an area on the information display interface, preferably contained within defined borders, that includes a set of features 265 represented by text or graphical objects, such as symbols or icons. Preferably, the set of features also includes manipulatable elements, such as buttons, graphically depicted feature controls, and/or selectable areas for invoking a specific function. Operational control of at least a portion of the radio communication system is conducted through one or more radio system control panels of an activated control sheet. Although radio system control panels are depicted in preferred embodiment, other system resource control or auxiliary functions can also be conducted through an appropriately configured control panel while employing concepts of the present invention. Thus, peripheral control functions may exist for telephone, networking, security, and other diverse applications.

Preferably, the control panel 260 is formed to have a number of features which are ordinarily represented by buttons or other graphical objects having icons, symbols, and/or text, to indicate the function of the object. For example, radio system control panel 263 has an icon 271 representing a real-time notifier, such as a communication signal, and an icon 272 representing a communication command, such as a transmit or broadcast directive. A real-time notifier may also be an alert for a current activity, alarm condition, and the like, or may indicate a communication in the form of an indicator for an incoming message or for communication activity on a communication channel. A real-time notifier may be represented by icons, buttons, text, or other visual indicators.

Control panels 260 may be defined to have various levels of detail, or differing sets of features, and consequently may vary in size. For example, two control panels 261, 264, corresponding to SYSTEM RESOURCE 1 and SYSTEM RESOURCE 5 on the activated control sheet 250 differ in level of detail or set of features. The space on a control sheet consumed by the control panels contained thereon, in part determines the maximum number of control panels which are directly accessible through the control sheet, i.e., accessible without scrolling or paging. As the set of features available on a control panel is user definable, a user may maximize the number of control panels directly accessible on a particular control sheet by minimizing the number of features available at each control panel, and consequently the size of the control panel, on the particular control sheet.

Figure 3:
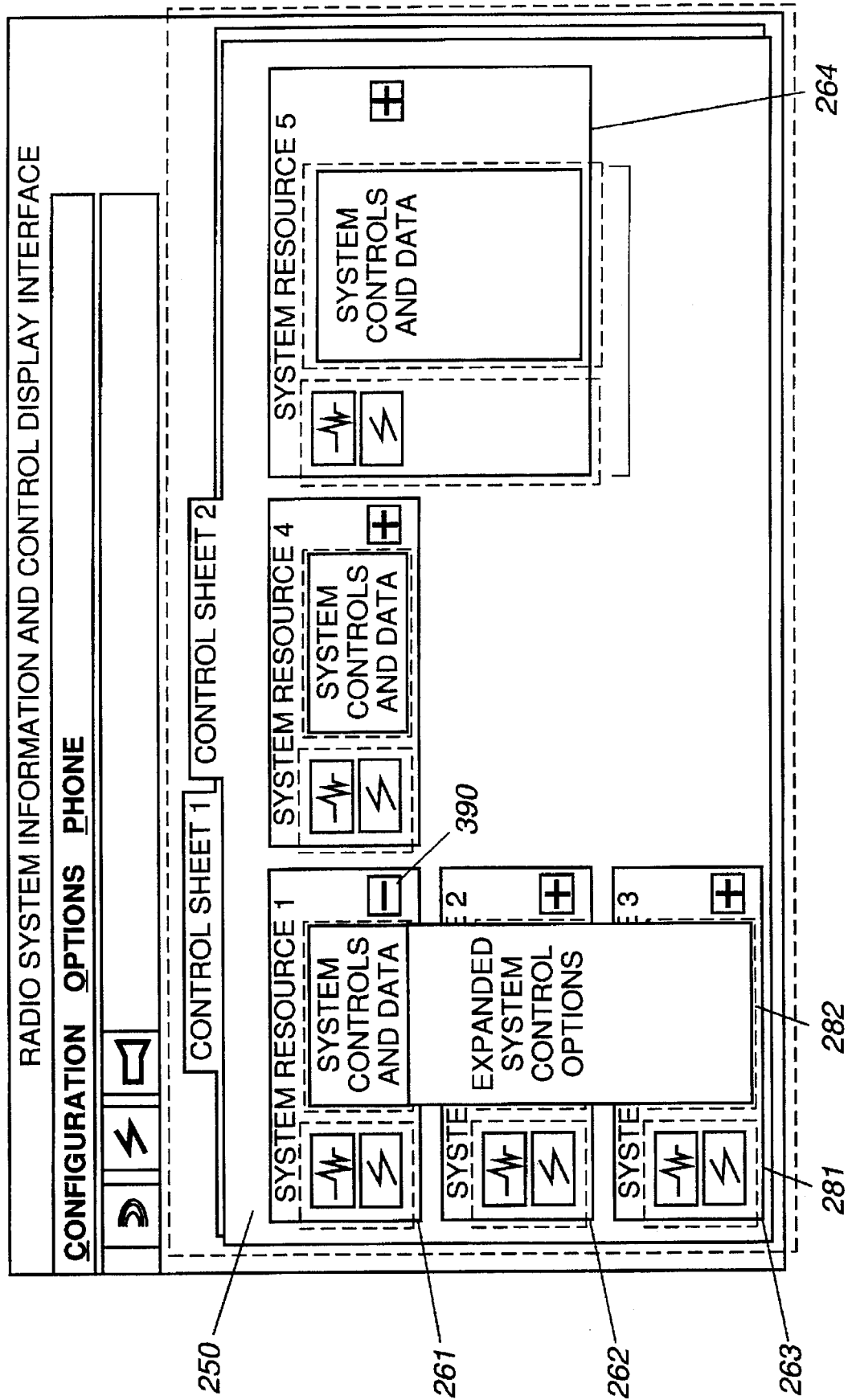
FIG. 3 shows the information display interface of FIG. 2 having one of the control panels operated in an expanded mode, in accordance with the present invention.

In many instances, it is desirable to maximize the number of control panels accessible via a control sheet, without sacrificing quick access to key resources through a particular control panel. Accordingly, a control panel may also defined to have two operating modes. In a first operating mode, the control panel is displayed within predefined borders in one of a number predetermined relative locations on the radio system control sheet. This operating mode is referred to herein as the compressed mode. FIG. 2 shows the control panel 261 operating in a compressed mode. In a second operating mode, a portion of the particular control panel extends beyond the predefined borders, and potentially covers a portion of a another control panel. This operating mode is referred to herein as the expanded mode. FIG. 3 is a display 300 of the information display interface 201 showing the control panel 261 operating in an expanded mode. A selectable option corresponding to the expandable control panel selects between operating modes. Referring to FIGS. 2 and 3, in the preferred embodiment, a button having a "+" icon 290 is displayed on the control panel 261 when in the compressed mode, and a button having a "−" icon 390 is displayed on the control panel 261 when in the expanded mode.

According to the present invention, a control panel 260 is defined to have a critical display area 281 and a non-critical display area 282. The critical display area 281 may contain important real-time notifiers, such as emergency or alarm indicators, or may contain an important control command function. When in an expanded mode (see FIG. 3), a particular control panel 261 may expand to cover the non-critical display area 282 of one or more control panels 262, 263 but may not cover a critical display area 281. In enforcing this display restriction, the control panels 260 are automatically sized and arranged to be contained within predetermined relative locations in a grid-like pattern arrangement. Preferably, the critical display areas 281 of different control panels are aligned, such that expansion of a control panel occurs along a channel which only contains non-critical display areas 282.

Figure 4:
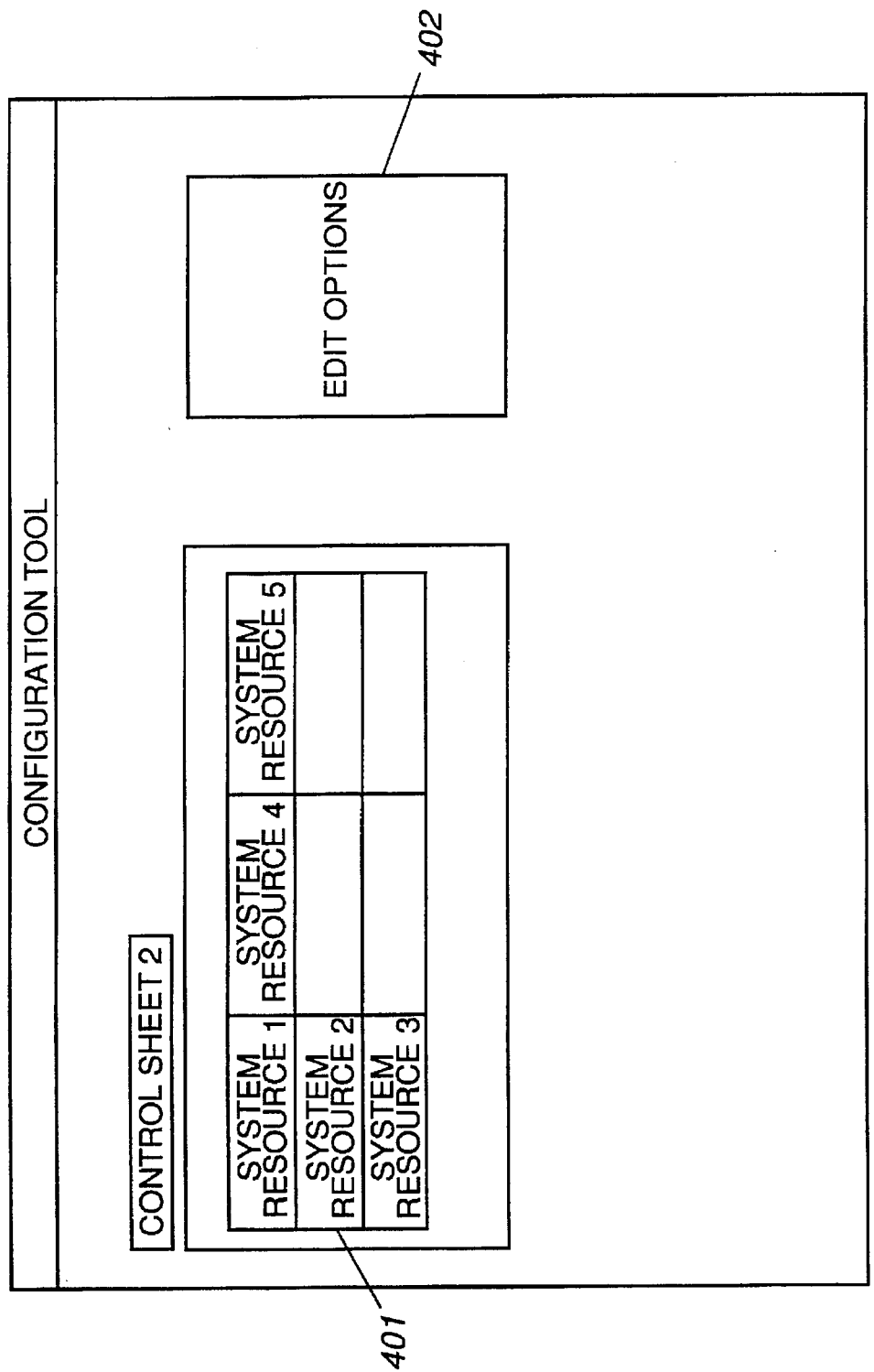
FIG. 4 shows a configuration tool operating on the information display interface to define the arrangement of control panels, in accordance with the present invention.

The arrangement of the control panels 260 with respect to each other is configurable. Accordingly, the information display interface 201 also includes a configuration tool. The configuration tool is operable on the information display interface 201 to define content for a new control sheet or to modify an existing control sheet. Generally, the content for the control sheet is defined using one or more related radio system control panels as previously described. FIG. 4 shows a configuration tool 400 with definition options for a radio system control sheet. The configuration tool 400 allows a configuration operator to designate the relative positioning of each control panel of the control sheet. A grid pattern 401 is presented to aid is such relative positioning. The grid pattern 401 also helps to automatically restrict placement of a control panel to one of a number of predetermined relative locations. Other options (not shown) enable the user to define the content of a control panel, and to assign such specifics as the category name for the control sheet. Editing functions 402 are included for user manipulation. Such editing functions are common in the art and no further explanation is provided. The configuration tool 400 also allows categorization of the control panels, i.e., which control panels appear on which control sheet.

An information display interface, according to the present invention, provides significant benefits. The informational display interface provides for an organization of information on a display unit to enhance the efficiency and ease with which an operator can effectively control a radio communication system. A particular control panel may be displayed in a minimized, or compressed, format to maximize the number of control panels which is directly accessible on a control sheet. When access to additional features is desired, the particular control panel may be expanded to cover part, but not all of another control panel. In particular, the expansion of a control panel does not obscure critical display areas of another. The organization and presentation of important control information is critical to the efficient operation of a radio communication system. In many instances, the quick access to important control functions for different portions of a radio communication system is essential. The information display interface of the present invention facilitates efficient organization of information and controls for such purposes.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of operating a display interface for control of a radio communication system comprising the steps of:

forming, on the display interface, a plurality of radio system control panels each having a critical display area and a non-critical display area;

displaying the plurality of radio system control panels within predefined borders when in a first operating mode, and to have portions expanding beyond the predefined borders when in a second operating mode; and automatically restricting arrangement of the plurality of radio system control panels to a relative pattern such that a radio system control panel operating in the second operating mode never covers the critical display area of another radio system control panel of the plurality of radio system control panels.

2. The method of claim 1, wherein the step of automatically restricting arrangement comprises the step of arranging first and second control panels of the plurality of radio system control panels such that the non-critical display areas of the first and second control panels are aligned, and wherein the step of displaying comprises the step of expanding the non-critical display area of the first control panel to cover at least in part the non-critical display area of the second control panel without covering the critical display area of the second control panel, when in the second operating mode.

3. The method of claim 1, wherein the step of automatically restricting arrangement comprises the step of placing each of the plurality of radio system control panels in one of a plurality of grid locations.

4. The method of claim 1, further comprising the step of performing, by an operator, operation control of a portion of the radio communication system through at least one of the plurality of radio system control panels.

5. A method of providing for radio communication system control through an information display interface, the method comprising the steps of:

displaying a radio system control sheet on the information display interface;

forming a plurality of radio system control panels with critical and non-critical display areas for display within predefined borders on the radio system control sheet when in a first operating mode, and to have portions expanding beyond the predefined borders when in a second operating mode; and arranging the plurality of radio system control panels in a relative pattern such that a radio system control panel operating in the second operating mode never covers the critical display area of another radio system control panel of the radio system control sheet.

6. The method of claim 5, wherein the step of arranging comprises the step of automatically restricting placement of a radio system control panel to one of a plurality of predetermined relative locations on the radio system control sheet.

7. The method of claim 5, wherein the step of forming comprises the step of forming the critical display area with icons representing communication commands.

8. The method of claim 5, wherein the step of forming comprises the step of forming the critical display area with icons representing communication signals.

9. The method of claim 5, wherein the step of forming comprises the step of forming control panels representing communication channels.

10. In a radio communication system providing operator assisted operation control of a radio communication system, an apparatus comprising:

a wireless communicator;

a computer coupled to the wireless communicator, the computer having a display unit;

an information display interface displayed on the display unit;

a radio system control sheet displayed on the information display interface; and a plurality of radio system control panels having critical and non-critical display area, and displayed within predefined borders on the radio system control sheet when in a first operating mode, and having portions expanding beyond the predefined borders when in a second operating mode, wherein the plurality of radio system control panels is arranged in a relative pattern such that a radio system control panel operating in the second operating mode never covers the critical display area of another radio system control panel of the radio system control sheet.

11. The apparatus of claim 10, further comprising a configuration tool operable on the information display interface to define content for a new control sheet from a group of related radio system control panels.

12. The apparatus of claim 10, wherein the critical display area comprises icons representing communication commands.

13. The apparatus of claim 10, wherein the critical display area with comprises icons representing communication signals.

* * * * *